United States Patent [19]

Steinke

[11] Patent Number: 4,939,885
[45] Date of Patent: Jul. 10, 1990

[54] CHUB MACHINE

[75] Inventor: Gary L. Steinke, Bettendorf, Iowa

[73] Assignee: The Kartridg Pak Co., Davenport, Iowa

[21] Appl. No.: 339,726

[22] Filed: Apr. 18, 1989

[51] Int. Cl.$^5$ .......................... B65B 9/12; B65B 61/06
[52] U.S. Cl. ..................................... 53/138 A; 53/552
[58] Field of Search ........................ 29/243.56, 243.57; 53/138 A, 138 R, 577, 583, 552, 551

[56] References Cited

U.S. PATENT DOCUMENTS

| | | | |
|---|---|---|---|
| 2,831,302 | 4/1958 | Jensen et al. | 53/383 X |
| 3,324,621 | 6/1967 | Runge | 53/138 A |
| 3,380,226 | 4/1968 | Tracy | 53/138 A |
| 3,382,641 | 5/1968 | Jensen | 53/138 A |
| 3,587,204 | 6/1971 | George | 53/138 A |
| 3,795,083 | 3/1974 | Wells | 53/138 A |
| 3,942,302 | 3/1976 | Bloom | 29/243.57 X |
| 4,085,778 | 4/1978 | Wright | 53/583 X |
| 4,223,508 | 9/1980 | Wells | 53/552 X |
| 4,516,379 | 5/1985 | Iain | 53/138 A |

OTHER PUBLICATIONS

The Kartridg Pak Co. Service Manual for Model 50 Chub Machine, (cover page; pp. i, ii, iii, pp. 31-34 and 43).
The Kartridg Pak Co. Service Manual No. 075-007-00-700, "M-7 Heavy Duty Clip Accessory", for Model 43 & 44 Chub Packaging Machine, (cover page; p. i; pp. 5, 6 and 11).

Primary Examiner—John Sipos
Assistant Examiner—Beth Bianca
Attorney, Agent, or Firm—Lockwood, Alex, FitzGibbon & Cummings

[57] ABSTRACT

Improvements in a Chub packaging machine wherein paris of clips are applied to voided constricted lenghts of the filled tubing and then such lengths are severed mid-way between each pair of clips. In one improvement the severing knife operates within a composite or dual gathering plate allowing the spacing between the clips in each pair to be appreciably closer than is conventional, thereby reducing wastage of film and product adhering thereto and producing Chub packages with shorter tails or stubs at their opposite ends.

7 Claims, 7 Drawing Sheets

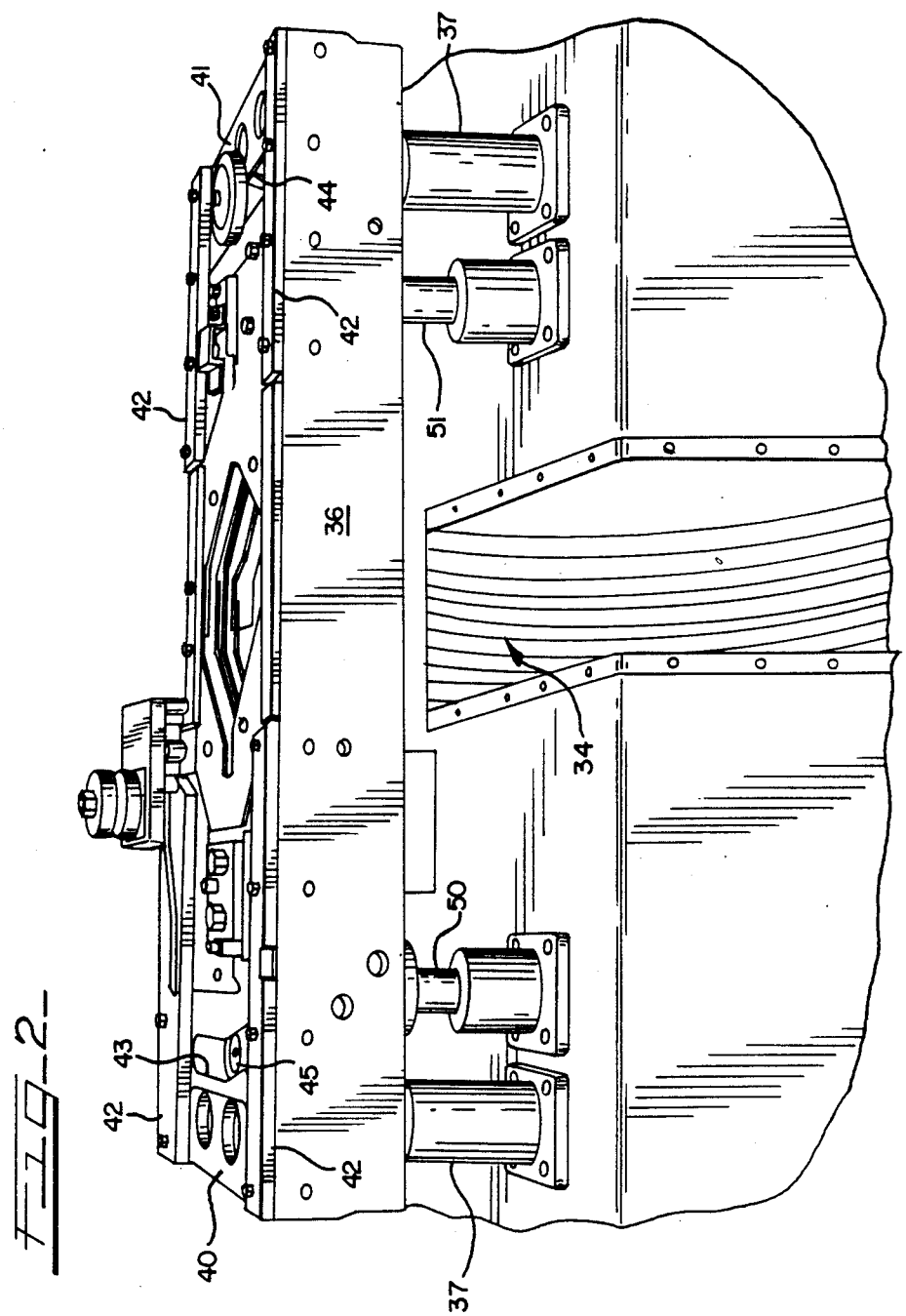

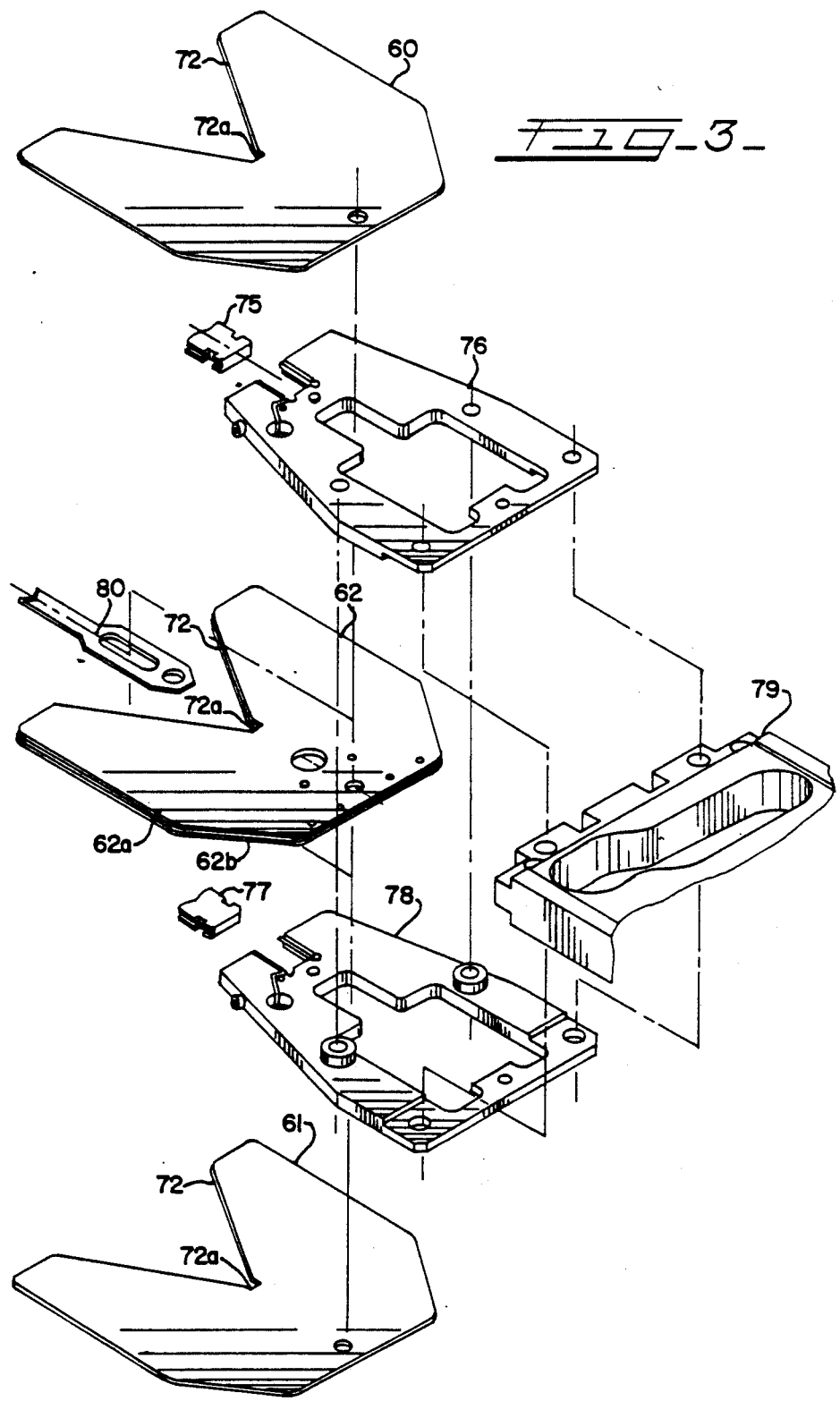

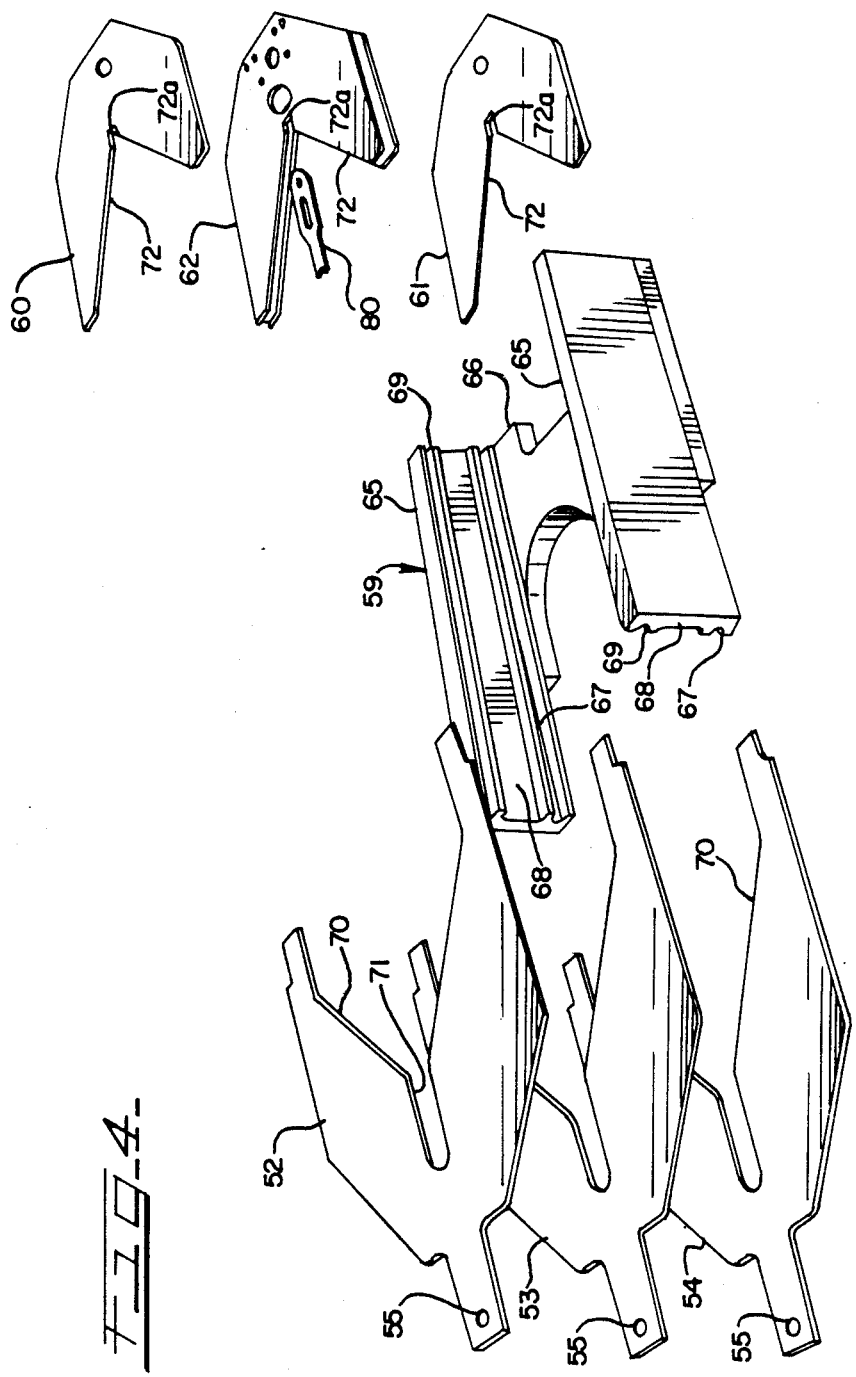

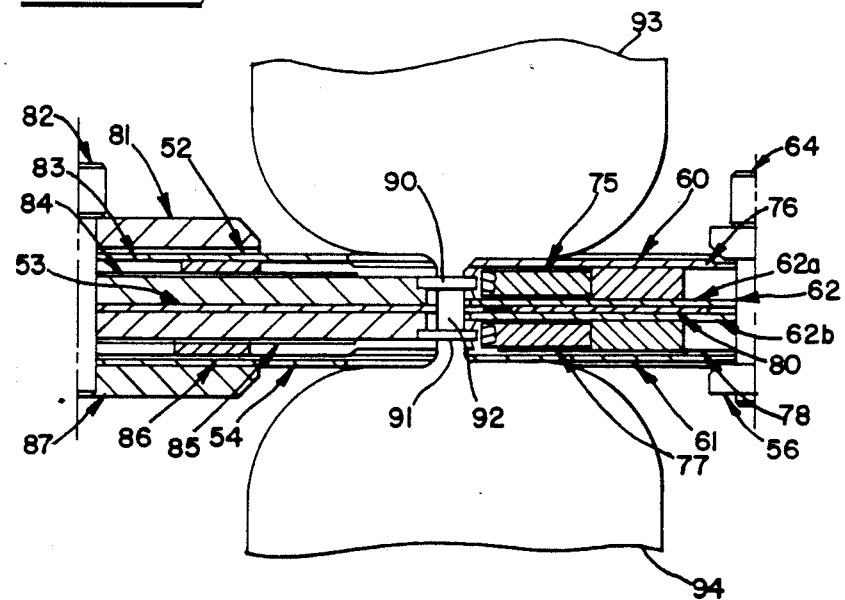
FIG_5_
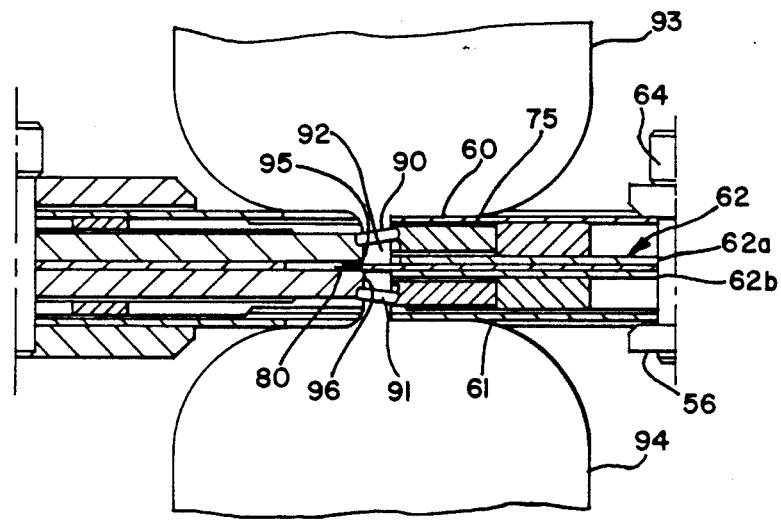
FIG_6_

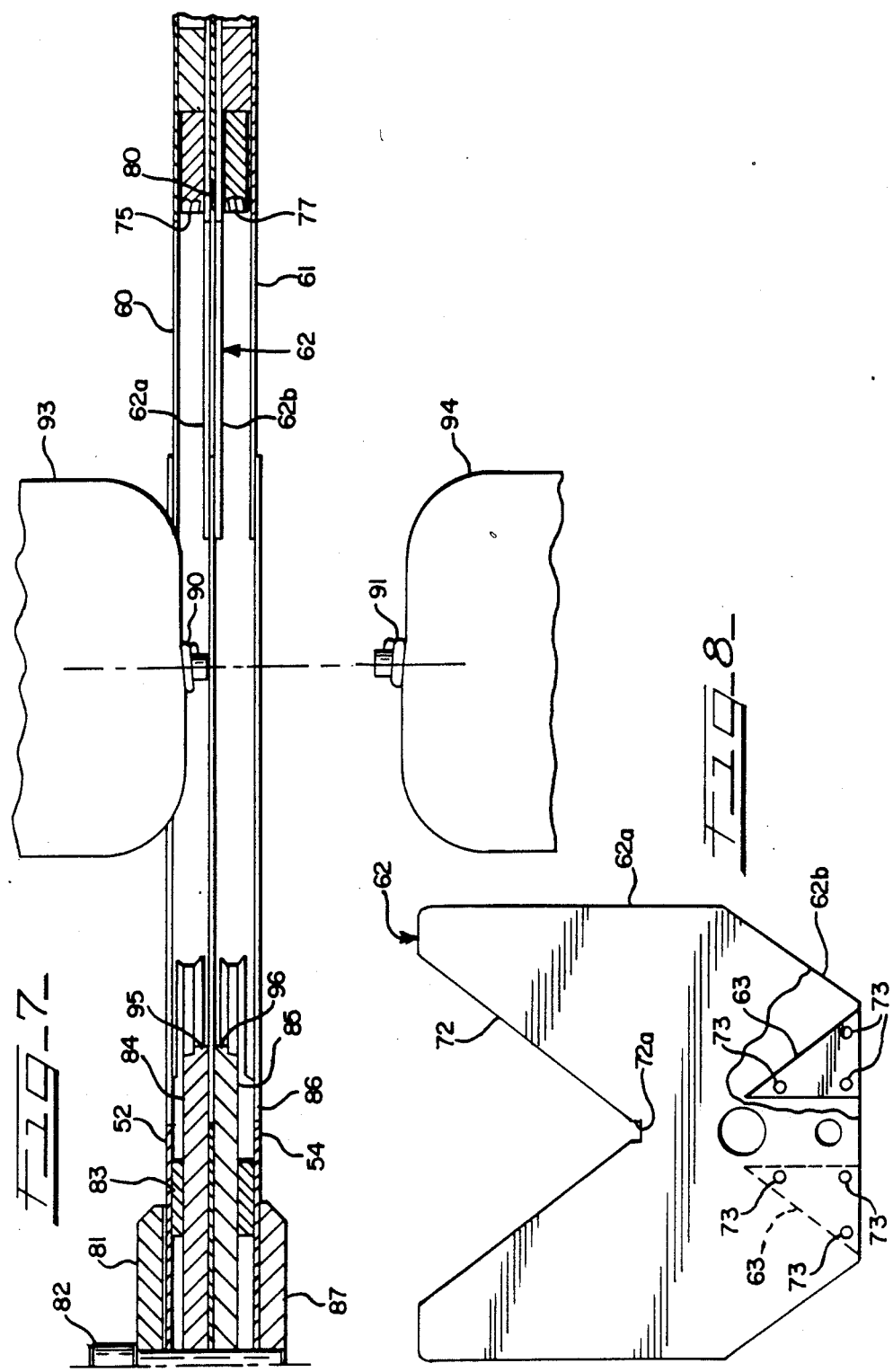

CHUB MACHINE

This invention relates, generally, to innovations and improvements in package-forming machines known in the packaging art as Chub machines which form tubular packages which are gathered and clipped at opposite ends.

An early form of the Chub machine is disclosed in U.S. Pat. No. 2,831,302 issued Apr. 22, 1958. Improvements and innovations on the original Chub machine have been made over the years, a number of which have formed the subject matter of additional U.S. patents, including: U.S. Pat Nos. 3,324,621 dated June 13, 1967; 3,795,083 dated Mar. 5, 1974; 3,380,226 dated Apr. 30, 1968; 4,085,778 dated Apr. 25, 1978; and 4,223,508 dated Sept. 23, 1980. These additional patents have been assigned to the assignee of the present invention. In addition to disclosures in the foregoing patents, Chub package forming machines are in wide use in this country and described in printed service manuals, and have been commercially available from The Kartridg Pak Co. of Davenport, Iowa for a number of years. Chub machines can be used for packaging many flowable or extrudable materials. For example, various edible products such as ground meat, cheese, liver sausage, butter, ice cream and cookie dough have been packaged utilizing the Chub machines. Inedible products have also been packaged utilizing the Chub machines including explosives.

In operation, a Chub machine continuously unwinds and forms a tube from a roll of film, fills the tube with a flowable material, gathers or constricts at regular intervals spaces short lengths of the filled tubing, applies a pair of closures clips to each gathered length of tubing, and severs the gathered or constricted material between the individual clips in a pair thereof.

In operation, the Chub machines also unwind two strands of wire from coils or reels and cut off predetermined lengths from the ends of the wire so as to provide the clips which are then suitably formed and constricted in pairs to each gathered length of the tubing.

The wire feeding and cut off mechanism in a Chub machine is operably associated with a so-called closure head in which certain of the above-mentioned package forming functions are performed, namely, i.e. clip forming, gathering, clip applying and severing. The closure head assembly includes a pair of reciprocally opposing closure heads which are slidably mounted in a carriage on the machine for movement toward and away from each other so as to define a variable sized aperture therebetween. The continuously formed tube with the fluid or flowable material therein passes vertically through the aperture and perpendicularly to the horizontally reciprocating closure heads. Further, the closure head carriage reciprocates between the upper and lower positions in order to sychronize the performance of the closure head assembly functions with the continuous movement of the tube and fluid downwardly through the machine.

As disclosed in the above-mentioned patents pertaining to the Chub machine, the fluid material in the continuously formed and descending tube is "voided" or "displaced" from a short length of the tubing prior to, or during the gathering or constricting function of the closure heads depending on the viscosity of the product. As a practical matter, the complete displacement of the fluid contents from the short length of the tubing is not normally achieved. Either small droplets or deposits of the filling material remain in the voided lengths of the tubing, or a backlash effect from the voiding causes some material to re-enter a gathered length of tubing before a pair of spaced closure clips are securely fastened therearound. The spacing between individual closure clips in each pair as applied in the current state-of-the-art Model M 7 Equipped Chub machine is approximately 0.76 inch. With the gathered tubing being severed midway between each pair of crimped closure clips, each package will have a tail or stub on its opposite ends having a length of approximately 0.38 inch. Each such tail or stub will contain some small residue or deposit of the packaged product which will be exposed to the ambient air.

It has long been appreciated in the art of Chub machines that it would be highly desirable and beneficial to reduce the lengths of such tails or stubs on the Chub packages, provided, of course, that the integrity of the closure or seal provided by the clips was not impaired or sacrificed and the speed of operation of the Chub machines did not have to be reduced. Such benefits would result in a substantial reduction of wasted film and of the filling residue occupying each tail. In addition, Chub packages with shortened tails would be more attractive appearance-wise and require less shipping space.

One approach to reducing the lengths of the tails or stubs on Chub packages produced in Chub machines was to sever the usual lengths of gathered tubing in two places instead of midway between the applied clips. Even though the length of wasted film and filling material would remain the same, the lengths of the tails or stubs would be reduced while achieving certain of the benefits and advantages above noted. However, there would be no reduction in wasted film and product and there would be the new disadvantage and problem of collecting and disposing of the severed intermediate lengths of the gathered film as they were cut off between the pairs of spaced cut off knives. An embodiment of the Chub machine incorporating the spaced knife concept is shown and described in above-identified U.S. Pat. No. 4,223,508. However, in practice the double knife or spaced knife approach to the problem was found not to provide a sufficiently attractive solution so as to go into extensive use.

The object of the present invention, generally stated, is the provision of an improvement in Chub machines which operates to sever the gathered lengths of tubing intermediate the applied clips midway therebetween as before but with the clips being spaced substantially closer together than has been the prior practice, and to accomplish this closer spacing of the clips and the attendant advantages of the resulting shorter tails o stubs without encountering or suffering any disadvantages. In practice, the spacing of the clips has been reduced from 0.76 inch to 0.50 inch, a reduction of approximately one-third which is substantial in view of the large quantities involved in commercial production. Certain more specific objects of the invention will be apparent to those skilled in the art in the light of the following detailed description of a preferred embodiment of the invention taken in connection with the accompanying drawings, wherein:

FIG. 2 is a perspective view, on enlarged scale, with portions removed for clarity, of the closure head assembly of an M 7 Equipped Chub machine in which the improvements of the present invention may be installed;

FIG. 3 is an exploded perspective view of the knife severing mechanism and co-acting gathering plates and clip clinching anvils which are incorporated on the right hand closure head of the closure head assembly shown in FIG. 2;

FIG. 4 is an exploded perspective view showing the right hand and left hand closure or gathering plates and the magazine holder therefore, in accordance with the present invention;

FIG. 5 is a fragmentary sectional view on enlarged scale taken on line 5—5 of FIG. 1 showing the operation of the closure heads incorporating the improved severing and clipping mechanisms of the present invention as they would appear with the heads nearly closed prior to severing;

FIG. 6 is a fragmentary sectional view similar to FIG. 5 showing the clips fully closed or crimped and the severing knife in its advanced position after severing;

FIG. 7 is a view corresponding to FIGS. 5 and 6 but showing the closure head mechanisms in their retracted condition with the completed lower Chub package falling away after having been severed;

Figure 1:
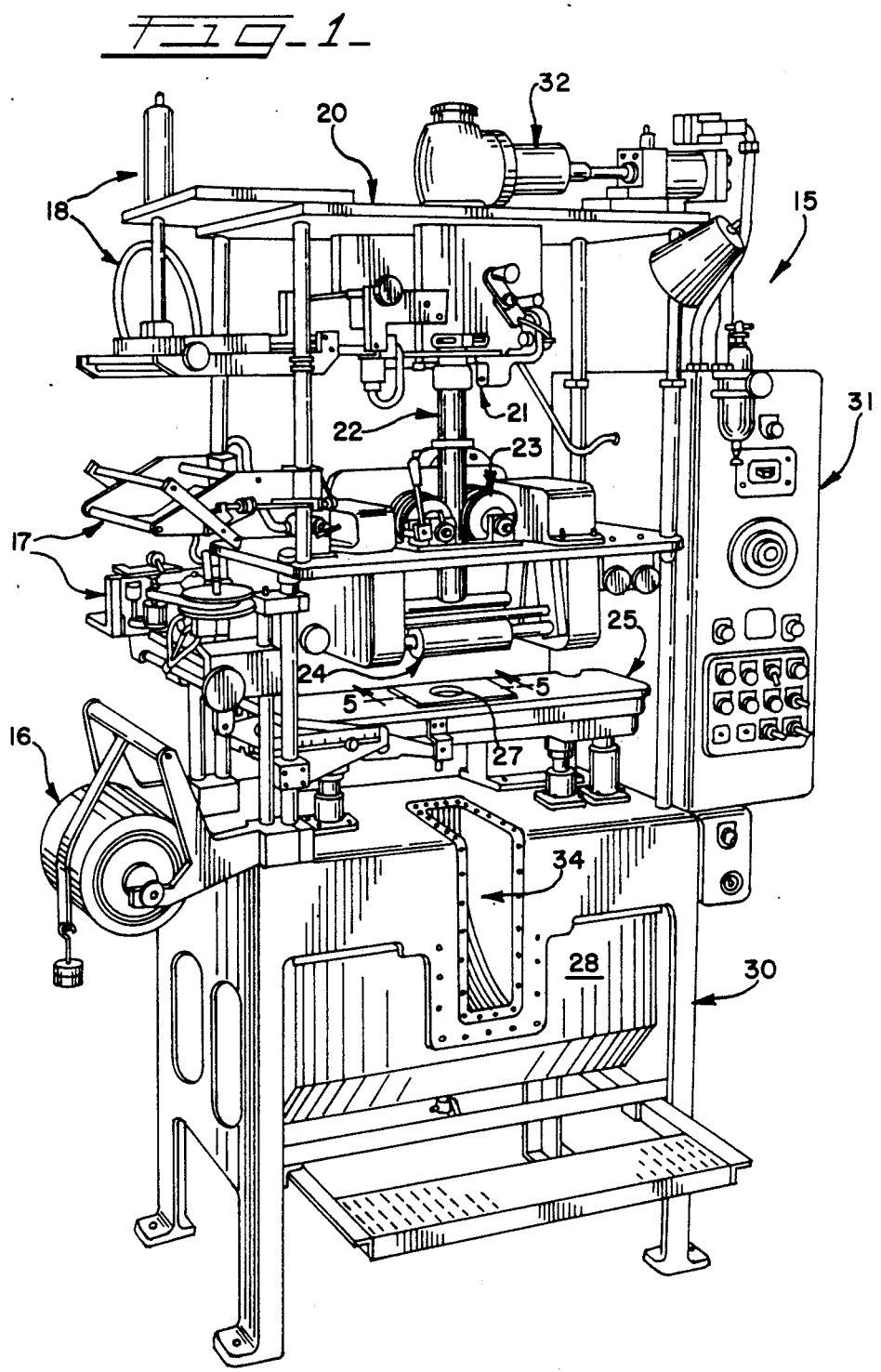
FIG. 1 is a perspective view of a Chub packaging machine in which a closure head assembly incorporating the improvements of the present invention may be installed.
Figure 9:
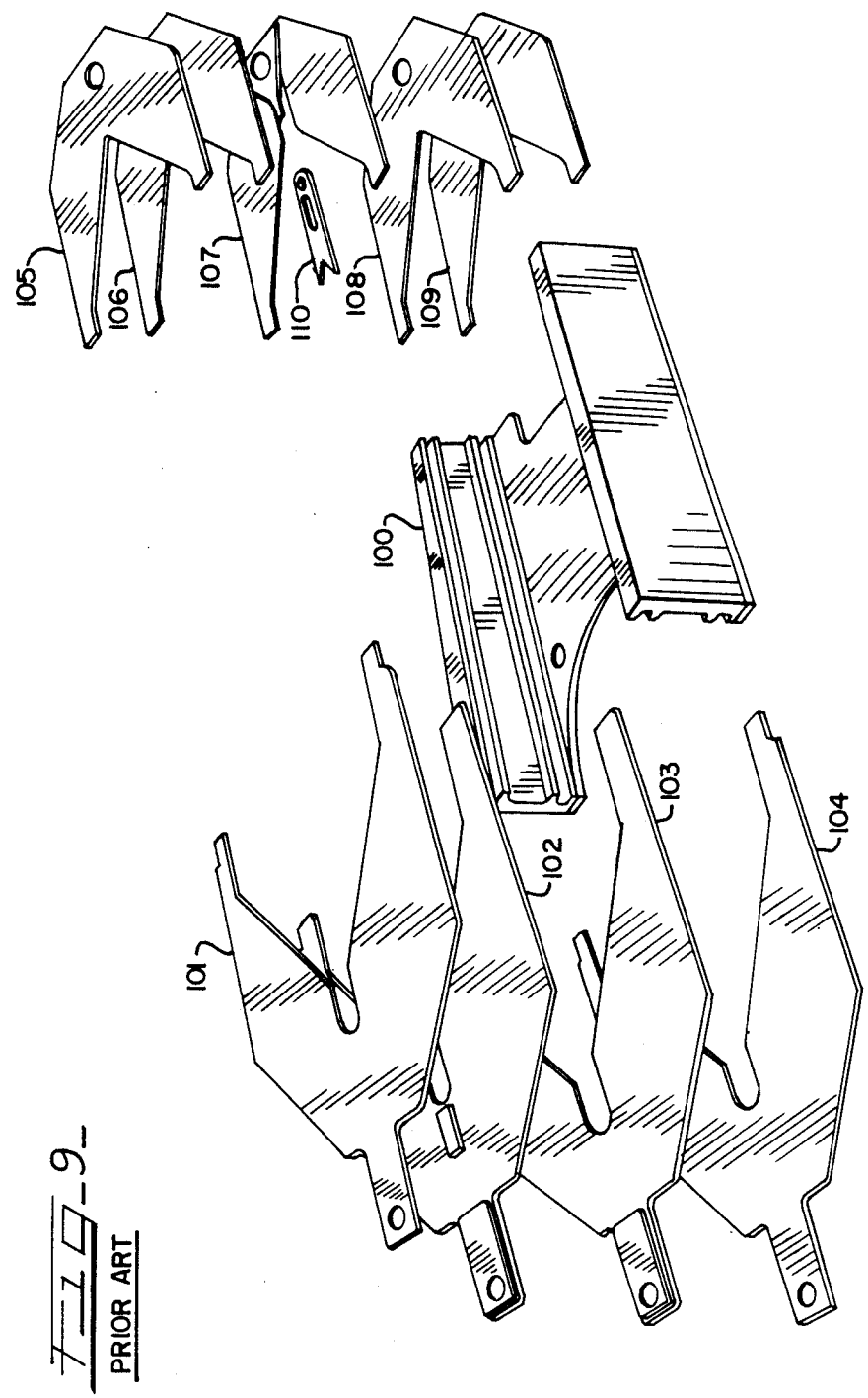

FIG. 8 is a top plan view, partly broken away, of a composite gathering plate and severing knife guide shown in FIG. 3; and FIG. 9 is an exploded perspective view corresponding to FIG. 4 showing the prior art closure or gathering plates or knife assemblies and their magazine retainer as heretofore used in state-of-the-art M 7 Equipped Chub machines. Referring to FIG. 1, a Chub packaging machine is indicated generally therein at 15 which is representative of Chub machines commercially available from The Kartridg Pak Co., Davenport, Iowa but into which have been incorporated the improvements of the present invention as shown and illustrated in FIGS. 3–7. The machine 15 will be readily recognized by those familiar with Chub machines as having a film arbor 16, a pricer dater 17, a thermo conditioner 18, a canopy 20, a tube seam overlap sealer 21, a mandrel 22, a film drive 23, a voider 24, a closure head assembly 25, a wire cut-off/feed mechanism (not shown) affixed to the closure head assembly and a drive mechanism (not shown) positioned inside of a cover 28. All of the foregoing sub-assemblies or components are suitably mounted on the frame of the machine 15 which is indicated generally at 30. Also mounted thereon is the electrical cabinet and control panel indicated at 31 and a piston-type product withdrawal mechanism 32. The wire feeding mechanism is on the rear side of the machine and not visible in FIG. 1.

As is well known to those familiar with Chub machines, conventionally a web of packaging film in roll form is continuously withdrawn from the arbor 16 when the machine is in operation. The web is led upwardly over the pricer dater 17, through the thermo conditioner 18, and then to the film folder. In the film folder, the side edges of the film are overlapped with the film being thereby formed into a tube surrounding the upper portion of the mandrel 22. The sealer 21 acts to heat seal or otherwise bond the overlapped edges thereby completing the formation of a continuous tube. The film drive 23 engages the exterior of the tube and serves to continuously feed the tube downwardly.

Below the film drive mechanism 23, the tube receives a metered quantity of flowable product through the mandrel 22. On passing through the voider 24, the voider rolls, at predetermined intervals, momentarily swing inwardly together compressing the product-filled tube and thereby substantially voiding or expelling product from the portion of the tube which has been flattened or compressed. Simultaneously with the voiding action, the product withdrawal mechanism 32 relieves the product pressure in the tube by withdrawing an amount of product from the supply tube and returns it to the supply tube after the voiding is completed. Each voided length of tube is gathered, has a pair of closure clips applied thereto and is severed by the novel knife mechanism (FIG. 3) of the invention as the voided length passes downwardly in synchronism with the reciprocating closure head 25. Each cut off Chub package falls into the discharge chute 34 to be collected in a suitable container or otherwise removed.

In operation, the closure head assembly 25 reciprocates between upper and lower positions under the control of a cam drive. While in the upper position, the closure plates operate to gather the film in the previously voided area. As the closure head assembly reciprocates downward to match the film and product speed, the clips are applied to the gathered film and the knife severing mechanism which is mounted on the closure head assembly 25 then operates to sever the packaging material mid-way between the closely spaced clips thereby separating the completed lower chub package from the upper chub package which has been formed only at one end. The completed packages fall into the discharge chute 34 as mentioned above.

As the product-filled tube moves through the closure head assembly, a package guide 27 (FIG. 1) limits tube side sway movement thus providing greater accuracy in both positioning the closure clips on the tube and in severing the tube in close proximity to the clips.

Referring to FIG. 2, the closure head assembly 25 includes a hollow, transversely extending, generally rectangular carriage or frame 36 supported at opposite ends by elevating shafts (not shown) which are reciprocably mounted in bushings 37—37 and driven by cams (not shown) forming a portion of the drive mechanism mounted behind cover 28 in the lower frame 30 (FIG. 1), as previously mentioned. Inside the carriage 36, end cams 40, 41 are slidably mounted for transverse movement toward and away from each other. Guide strips 42—42 are mounted on the top of the side rails of carriage 36 along the opposite side edges of each end cam 40, 41 so as to retain them in the carriage while permitting their sliding movement. The ends cams 40 and 41 are provided with cam slots 43 and 44, respectively, which are adapted to receive cam rollers 45, 46, respectively. Each roller is operatively engaged with one of the operating shafts 50, 51, respectively which are connected at their bottom ends in driving relation to the drive mechanism.

End cam 40 has secured to its inner or leading end three relatively thin, inwardly projecting tube-gathering closure plate members 52, 53 and 54 (FIG. 4). The plate members 52-54 are identical and their leading portions are slidable in a magazine or retainer 59 as will be explained presently. The closure plates 52-54 are held in superposed relationship and anchored to the end cam 40 by means of a vertical plate/knock-out punch pin 82 (FIG. 5) extending through openings 55—55 in the tail portions at the rear of the plates 52-54.

End cam 41 has a spring load block 56 (FIG. 5) secured to its inner or leading end. Attached to the spring load block 56 are two relatively thin, inwardly projecting tube constricting closure plates 60, 61, the forward or leading portions of which are slidable in the magazine or holder 59. Also mounted in the spring load block 56 intermediate the gathering plates or constricting plates 60, 61 is a dual or composite tube constricting closure plate 62 which is formed by a pair of spaced thin plates 62a and 62b corresponding to plates 60 and 61 suitably secured together in spaced relationship so as to accommodate in guiding relationship therebetween cut-off knife 80 therebetween. The tube constricting plates 60, 61 and 62 are secured to the block 41 and in their superposed relationship by means of a plate pin 64 (FIG. 5).

As is known to those familiar with the Chub machines, the magazine 59 is removably mounted between the mid-portions of the side frame members 36—36. The magazine 59 comprises two upstanding side rails 65 secured in parallel alignment by the bottom support 66 to which they are suitably joined. Each guide 65 has a lower slot or groove 67, a relatively wide intermediate groove 68 and an upper groove 69.

The magazine 59 and the tube constricting plates 52–54 and 60–62 are removable from the closure head assembly 25 for cleaning and servicing purposes. When these parts are assembled or re-assembled, it is desirable that a certain procedure be followed. First, the plate 54 is inserted from the left into the groove 67 and then the plate 61 is inserted in groove 67 from the right on top of the plate 54. Composite plate 62 is then inserted from the right into the groove 68 and then single plate 53 is inserted between spaced plates 62a and 62b of plate 62. Next, plate 60 is inserted into the upper groove 69 and finally plate 52 is inserted in the groove 69 on the top of plate 60. The closures plates 52–54 and 60–61 are fully pushed into the magazine 55 from opposite sides before the resulting assembly is replaced in the closure head assembly 25 in known manner.

Each of the left hand closure or tube constricting plates 52–54 (FIG. 4) has a V-opening 70 at its leading inner end. At the rear, each of the openings 70 terminates in a longitudinal slot 71 rounded at its inner end. In a similar manner, each of the right hand closure plates 60–62 has a V-opening 72 at its leading or inner end. At the rear, each of the V-openings 72 has a square or rectangular throat 72a for a purpose described below. As is well understood in the art, the respective V-openings 70–72 close together, with the collapsed or voided portions of the tube being compressed into the respective elongated slots 71.

Referring to FIG. 3, the tube constricting or closure plates 60–62 are shown in association with the conventional associated components, namely, the upper anvil 75 and upper anvil holder 76 and the lower anvil 77 and lower anvil holder 78. The upper and lower anvil holders 76 and 78 are mounted on the right hand head cam 79 in known manner. The package cut-off knife 80 is normally disposed for reciprocal movement provided by the knife cam (not shown) between the upper and lower plates 62a and 62b forming the composite plate 62. As shown in FIG. 8, the plates 62a and 62b are secured together in proper spaced relationship by means of a pair of triangular spacers or shims 63 and rivets 73—73. The parallel inner edges 74 of the spacers 63 act as guides for the cut-off knife 80 (FIG. 3) during its reciprocation.

The components of the assembly which are conventionally associated with the left hand tube constricting closure plates 52–54 and right hand tube gathering or constricting plates 60–62 are shown in association therewith in FIGS. 5–7. Referring to FIGS. 5–7 and proceeding downwardly on the left side, the upper cut-off punch mount is designated at 81, the left hand plate/knock-out punch pin at 82, the upper cut-off punch at 83, the upper knockout punch at 84, the lower knockout punch at 85, the lower cut-off punch at 86 and the lower cut-off punch mount at 87. On the right side the components of the assembly are as described in connection with FIG. 3 with the right hand plate pin designated at 64.

In FIG. 5, the relationship between the parts is shown wherein the upper and lower wire clips 90 and 91 are shown in their pre-form condition and partially constricted around the gathered portion 92 with the cut-off knife 80 in its retracted position in the composite gathering plate and knife guide 62. The upper package which is still being formed is indicated at 93 while the lower package nearing completion is indicated at 94.

In FIG. 6, the left and right hand assemblies are shown advanced toward each other to their furthest inner positions and the wire clips 90 and 91 are completely formed and crimped to the constricted portion 92 of the tube which has been severed midway between the clips by the knife 80 shown in its advanced position. An important feature of the invention is illustrated in FIG. 6 wherein the constricted tube portion 92 is shown forced and compacted into the square throats 72a of the spring loaded composite or dual gathering plate 62 by the square or rectangular distal ends 95 and 96 of the knock out punches 84 and 85, respectively. During the tube severing function of the knife 80, the distal ends 95 and 96 being juxtaposed on opposite sides of the centerline with sufficient spacing to allow the knife to pass in close proximity therebetween, serve as knife anvils.

Upon separation of the left hand and right hand assemblies as shown in FIG. 7, the lower completely formed package 94 is shown in its free fall condition with the upper package 93 being shown in position ready to be advanced downwardly so as to have another set of closure clips applied at its upper or opposite end.

In the conventional or state-of-the-art Chub machine, there are at least four left hand tube constricting or closure plates and at least five right hand tube constricting or closure plates. Such a conventional arrangement is shown in FIG. 8 in association with a magazine 100. The four left hand closure plates are indicated at 101, 102, 103 and 104. The five right hand closure plates are indicated at 105–109 with the severing knife designated at 110.

What is claimed is:

1. In a machine for forming chub packages and having: means for forming a web of packaging material into a tube; means for continuously feeding said tube downwardly over a hollow mandrel; means for delivering a flowable product to said mandrel so as to discharge product from the lower end of said mandrel into said tube; and a vertically reciprocating closure head assembly through which said tube containing product passes and wherein during said passage short lengths of said tube are gathered and constricted between opposing sets of gathering plates carried on horizontally reciprocating support cams, pairs of spaced clips are applied to each said short length and each said short length is severed by a reciprocating cut-off knife between each said pair of applied clips, the improvement wherein;

one of said opposing sets of gathering plates includes a dual gathering plate comprising a pair of gathering plates fastened together in closely spaced relationship and within which said cut-off knife reciprocates, said one set of gathering plates comprises three gathering plates with said dual gathering plate being one of the three included in one of said sets and said other opposing set of gathering plates comprises three gathering plates with the center plate of the three comprising a single plate insertable between the plates of said dual gathering plate.

2. The improvement called for in claim 1 wherein the leading portions of said gathering plates have V-openings with the V-openings in one of said sets of gathering plates overlapping the V-openings in the other set when opposing sets close together during reciprocation and wherein each of the V-openings in said set which includes said dual gathering plate has a rectangular throat.

3. The improvement called for in claim 1 wherein said dual gathering plate has a leading or front end portion and a rear or trailing portion, and wherein said individual gathering plates comprising said dual gathering plate are fastened together in parallel spaced relationship at said rear portion by fasteners extending through shims located between said individual gathering plates on opposite sides of the front-to-rear centerline of said dual gathering plate.

4. The improvement called for in claim 3 wherein said shims have parallel front-to-rear inner edges lying on opposite sides of said centerline and said edges serve as guides for said cut-off knife.

5. In the machine called for in claim 1 wherein the one of said horizontally reciprocating support cams that carries said dual gathering plate also carries clip-forming and crimping anvils on opposite sides of said dual gathering plate, and wherein the remaining one of said support cams carries clip knock-out punches juxtaposed to opposite sides of the center one of said gathering plates mounted on said remaining support block and also carries clip cut-off punches juxtaposed to said knock-out punches.

6. In the improvement called for in claim 5 wherein the leading portions of said gathering plates have V-openings with the V-openings in one of said sets of gathering plates overlapping the V-openings in the other set when opposing sets close together during reciprocation; wherein each of the V-openings in said dual gathering plate has a rectangular throat; and wherein said clip knock-out punches have distal ends which can enter said rectangular throats in said dual gathering plate so as to force said gathered and constricted short lengths of tube into said rectangular throats.

7. The improvement called for in claim 6 wherein said cut-off knife passes in close proximity between said distal ends on said knock-out punches during the severing of gathered and constructed short lengths of tube whereby said distal ends acts as knife anvils.

* * * * *